United States Patent
Song (10) Patent No.: US 6,252,643 B1
(45) Date of Patent: *Jun. 26, 2001

(54) LIQUID CRYSTAL DISPLAY HAVING ONLY ONE COMMON LINE EXTENDING ALONG SUBSTRATE EDGE

(75) Inventor: In Duk Song, Kyungsangbook-do (KR)

(73) Assignee: LG LCD Inc. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/246,917

(22) Filed: Feb. 9, 1999

Related U.S. Application Data (63) Continuation of application No. 09/158,466, filed on Sep. 22, 1998, which is a continuation of application No. 09/009,671, filed on Jan. 20, 1998, now Pat. No. 5,831,709.

(30) Foreign Application Priority Data

Sep. 12, 1997 (KR) .................................................. 97-47248

(51) Int. Cl.⁷ ...................................................... G02F 1/136
(52) U.S. Cl. .............................. 349/139; 349/42; 349/149
(58) Field of Search ...................................... 349/149, 140, 349/143, 139; 247/59, 72

(56) References Cited

U.S. PATENT DOCUMENTS

| | | | |
|---|---|---|---|
| 4,832,455 | 5/1989 | Takano et al. | 349/149 |
| 4,840,459 * | 6/1989 | Strong | 349/55 |
| 5,311,342 | 5/1994 | Watanabe | 349/152 |
| 5,488,498 * | 1/1996 | Fujii et al. | 349/149 |
| 5,537,129 | 7/1996 | Okada et al. | 349/90 |
| 5,608,558 * | 3/1997 | Katsumi | 349/192 |
| 5,668,032 * | 9/1997 | Holmberg et al. | 438/149 |
| 5,686,976 * | 11/1997 | Nishikawa | 349/38 |
| 5,691,793 * | 11/1997 | Watanabe et al. | 349/155 |
| 5,734,450 | 3/1998 | Irie et al. | 349/39 |
| 5,742,074 * | 4/1998 | Takizawa et al. | 257/59 |
| 5,748,267 | 5/1998 | Natori et al. . | |
| 5,790,212 | 8/1998 | Lim | 349/42 |
| 5,831,709 * | 11/1998 | Song | 349/149 |
| 5,852,480 * | 12/1998 | Yajima et al. | 349/40 |

FOREIGN PATENT DOCUMENTS

| | | |
|---|---|---|
| 57-52027 | 3/1982 | (JP) . |
| 60-162221 | 8/1985 | (JP) . |
| 62-265689 | 11/1987 | (JP) . |
| 1-109327 | 4/1989 | (JP) . |
| 1-134498 | 5/1989 | (JP) . |

\* cited by examiner

*Primary Examiner*—Kenneth Parker
(74) *Attorney, Agent, or Firm*—Graham & James LLP (57) ABSTRACT

A liquid crystal display includes a first substrate having a plurality of pixel electrodes arranged in a matrix, a plurality of row terminals and common electrode terminals arranged on one side of two adjacent sides of the first substrate, a plurality of column terminals and common electrode terminals arranged on the other side of the two adjacent sides of the first substrate; a second substrate arranged to be opposite to the first substrate and to interpose a liquid crystal display with the first substrate and having a counter electrode for performing liquid crystal display by applying a voltage across the pixel electrodes and the counter electrode. The conductive region being connected to at least one of the common electrode terminals to apply a common potential to the counter electrode. Instead of using a common drive circuit, a single conductive region is formed along only a single one of the two remaining sides of the first substrate so as to allow for measuring of at least one of a voltage drop and a voltage signal delay occurring at a substantially central portion of the matrix.

32 Claims, 9 Drawing Sheets

LIQUID CRYSTAL DISPLAY HAVING ONLY ONE COMMON LINE EXTENDING ALONG SUBSTRATE EDGE

This is a Continuation of U.S. patent application Ser. No. 09/158,466 filed on Sep. 22, 1998, which is a Continuation of U.S. patent application Ser. No. 09/009,671 filed on Jan. 20, 1998, now U.S. Pat. No. 5,831,709.

BACKGROUND OF THE INVENTION

1. Field of the Invention

The present invention relates to a liquid crystal display (or "LCD") device which provides a structure that allows for detection of the distortion of the common voltage resulting from a delay time in application of the common voltage. More specifically, the present invention relates to a liquid crystal display device including a common line which eliminates the need for a common drive circuit and which is arranged to allow for detection of an amount of distortion of the common voltage so that such distortion can be corrected.

2. Description of the Related Art

Figure 1:
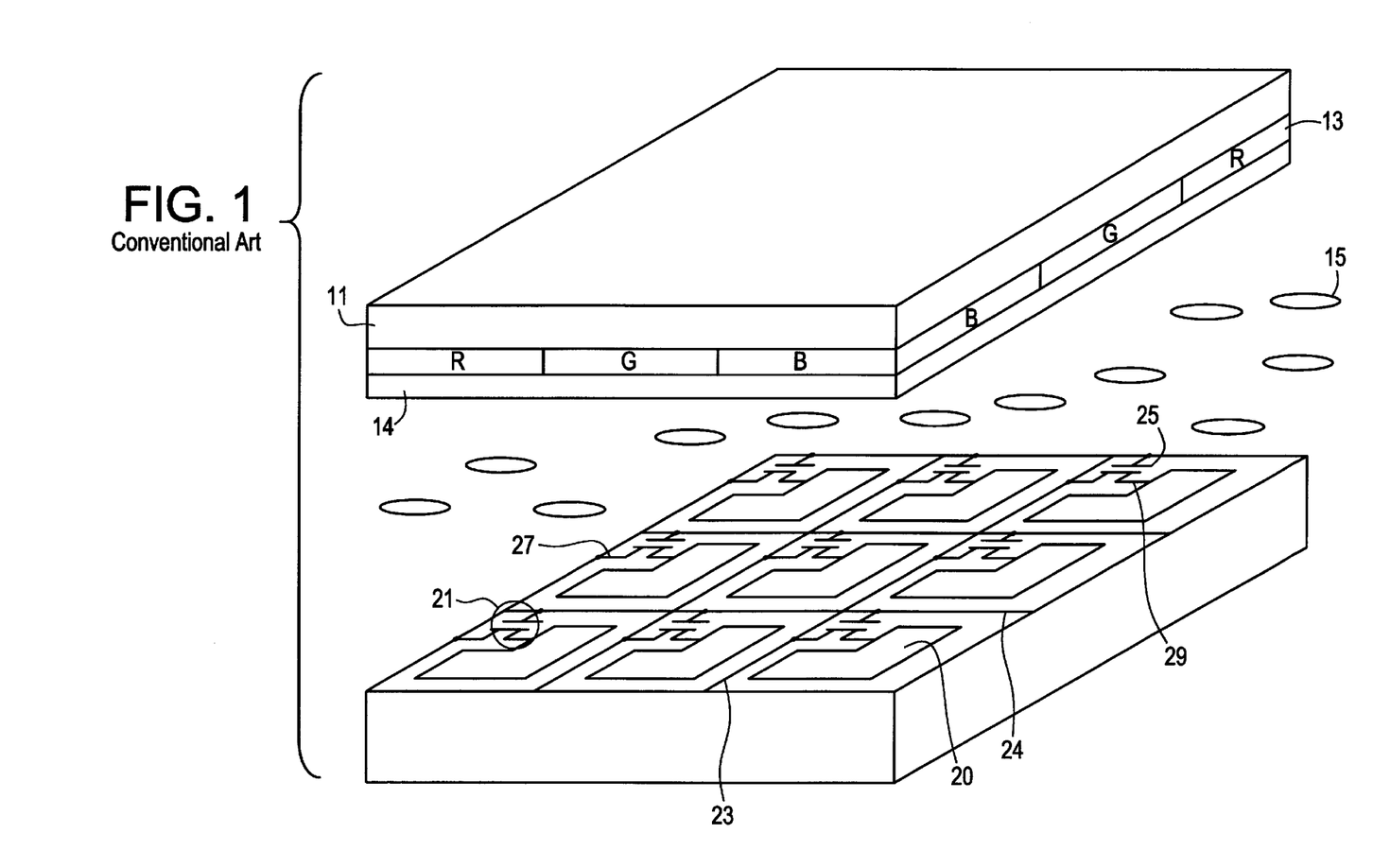
FIG. 1 is a perspective view showing the general structure of a conventional liquid crystal display device.

As seen in FIG. 1, conventional LCDs include two transparent panels, i.e., an upper panel 11 and a lower panel 10, and a liquid crystal material 15 injected between the upper panel 11 and the lower panel 10. The lower panel 10 includes a plurality of scan lines 24 and a plurality of data lines 23. The scan lines 24 and data lines 23 are arranged in a matrix form wherein the scan lines 24 and the data lines 23 intersect each other. At each intersecting point between the scan lines 24 and the data lines 23, a thin film transistor 21 (or "TFT") and a pixel electrode 20 are provided. The TFT 21 comprises a gate electrode 25, a source electrode 27 and a drain electrode 29. Each gate electrode 25 is connected to one of the scan lines 24 and each source electrode 27 is connected to one of the data lines 23. Each drain electrode 29 is connected to a respective pixel electrode 20. Although not shown in FIG. 1, one end of each scan line 24 is connected to an output of a scan driving IC and one end of each data line 23 is connected to an output of a data driving IC. Additionally, the lower panel 10 can comprise a portion of a common line carrying a common signal applied from an outer device.

As shown in FIG. 1, the upper panel 11 comprises a common electrode 14 and a color filter 13. There are three kinds of the color filters 13, a red filter (R), a green filter (G) and a blue filter (B). Each of the color filters 13 is disposed at a position corresponding to the position of the pixel electrode 20 in the lower panel 10. The common electrode 14 is formed on the color filter 13. Generally, the common electrode 14 is made with one body covering one of the major surfaces of the upper panel 11. Alternatively, the common electrode 14 comprises many bodies which are formed as strips arranged along with the scan lines 24 or the data lines 23.

A molecule array direction of the liquid crystal material 15 injected between the upper panel 10 and the lower panel 11 is changed by the voltage difference between the pixel electrodes 20 and the common electrode 14. When a scan voltage is applied to the scan lines 24, the TFT 21 is turned on by the voltage applied to the gate electrode 25. At that time, a data voltage applied to the data line 23 is sent to the drain electrode 29 from the source electrode 27 of the TFT 21 so that the data voltage is applied to the pixel electrode 20 which is connected to the drain electrode 29. Consequently, a voltage difference is generated between the pixel electrode 20 and the common electrode 14. As a result of the change of the molecule array direction of the liquid crystal material, the LCD functions as a display device.

Figure 2A:
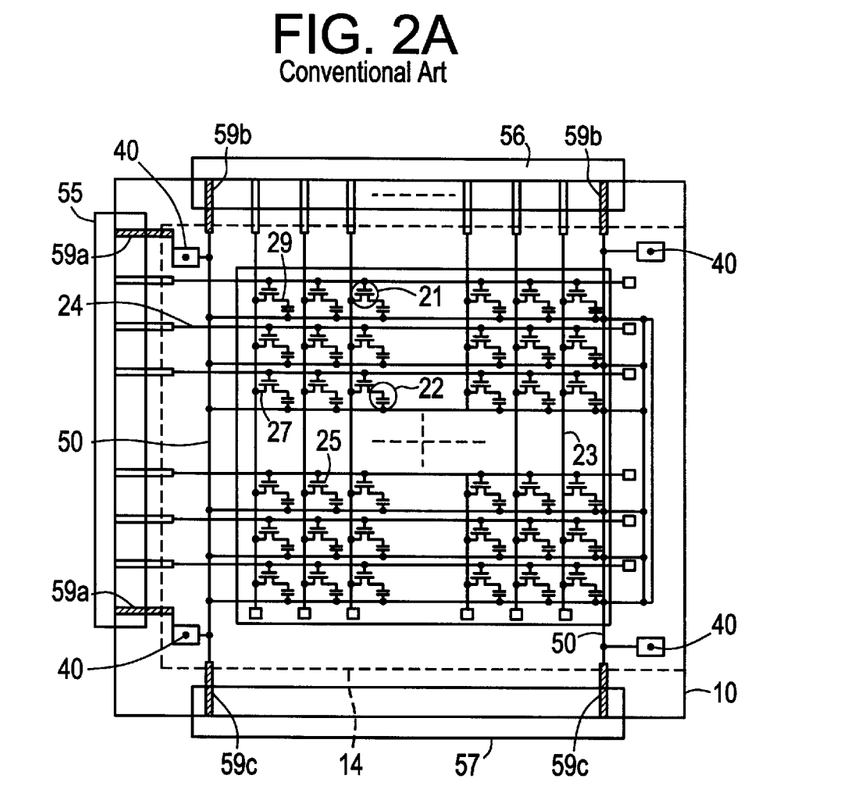
FIG. 2a is a plane view showing a common electrode, a driver IC common electrode and a silver dot in the conventional LCD device.
Figure 2B:
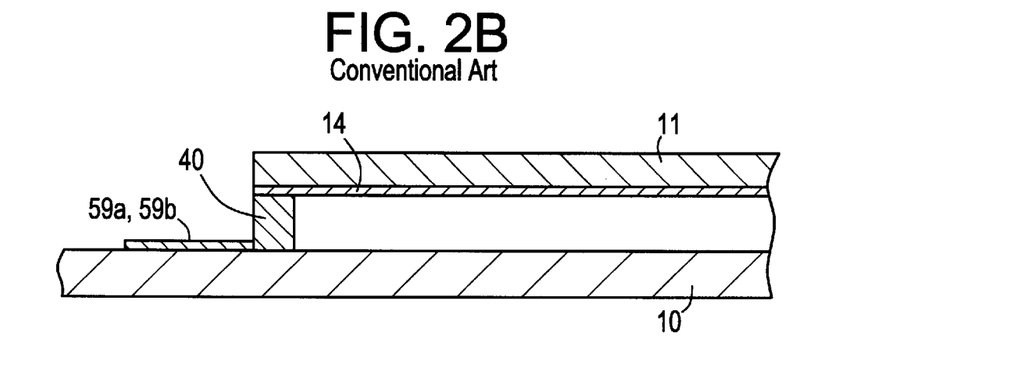
FIG. 2b is a cross-sectional view showing a common electrode, a driver IC common electrode and a silver dot in the conventional LCD device.

FIGS. 2a and 2b show the conventional structure of the common electrode 14 in a liquid crystal display device. Referring to the FIGS. 2a and 2b, the common pads 59a and 59b of the scan driver IC 55 and the data driver IC 56 apply a common voltage for the lower panel 10 to the common electrode 14 formed in the upper panel 11. A silver dot 40 (or Ag dot) is disposed in each of the four corners of the lower panel 10 in contact with the common electrode 14 and and to the scan driver IC common pad 59a and the data driver IC common pad 59b, so that the common voltage is applied to the common electrode 14 through the Ag dots 40.

In the LCD according to the above-mentioned structure, the wave form of the common voltage which is detected at the portion of the common electrode 14 located near the Ag dot is different from the wave form of the common voltage which is detected at the portion of the common electrode 14 located spaced from the Ag dot. The difference in wave form is caused by a signal delay which occurs because the common voltage signal is delayed by the resistivity of the common electrode 14. Therefore, it has been necessary to provide a third drive IC 57 for controlling the common electrode 14.

Figure 3:
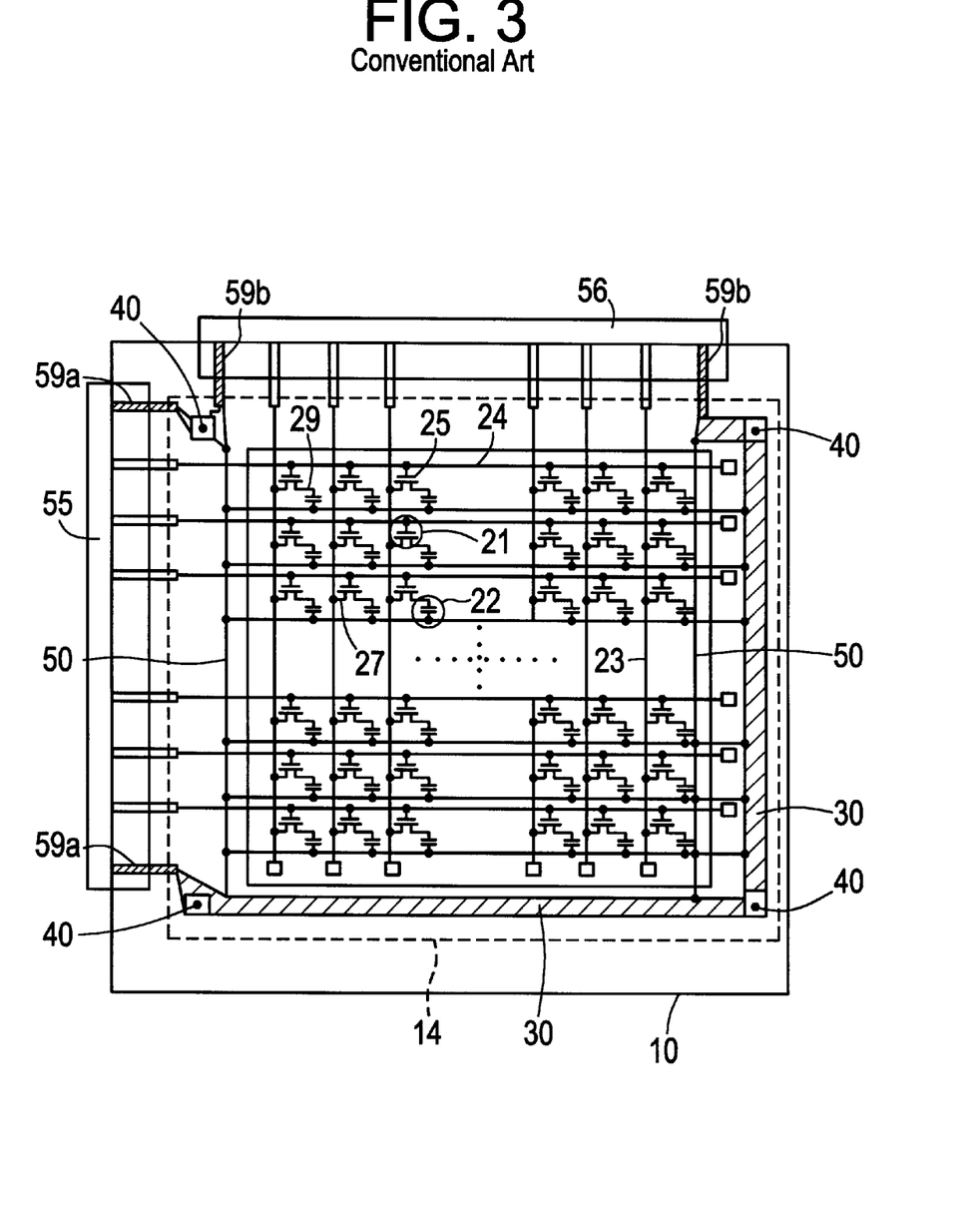
FIG. 3 is a plane view showing the structure of a conventional LCD.

In order to solve this problem without using a third drive circuit, U.S. Pat. No. 5,311,342 describes a structure, as shown in FIG. 3, in which an expanded common line 30 is formed continuously along two adjacent side portions of the matrix display portion of the LCD. The expanded common line 30 surrounds the matrix display portion by extending continuously from the scan pad part located at the lower left corner of the matrix portion in FIG. 3 to the data pad part located at the upper right corner of the matrix portion in FIG. 3 so that the scan pad part and the data pad part are connected each other. The common line 30 disposed in the lower panel 10 and the common electrode 14, shown as a dashed-line square in FIG. 3 and disposed in the upper panel 11, are connected to each other through the Ag dot 40. Additionally, a conductive line 50 which is separately formed with the common line is connected to the common electrode 14 in order to reduce the time delay of the common voltage.

However, the structure described in U.S. Pat. No. 5,311,342 experiences problems caused by the expanded common line 30 which is continuously formed to extend from the scan driver IC common pad 59a located at the lower left corner of the matrix portion in FIG. 3 to the data driver IC common pad 59b located at the upper right corner of the matrix portion of FIG. 3. Because of the common line 30 extending continuously between the data pad part and scan pad part, it is not possible to detect the exact amount of the delay time of the common voltage at the center of the display area. So, it is not possible to calculate the amount of the drop down voltage of the common voltage resulting from the time delay. Because such calculation of the drop down voltage is not possible, there is no way to compensate and correct for the drop down voltage. These problems result in flicker being generated in the image displayed by the device shown in FIG. 3 and also prevent uniformity of contrast and brightness in images displayed in the device of FIG. 3.

SUMMARY OF THE INVENTION

The preferred embodiments of the present invention overcome the problems described above by providing an LCD which is adapted to allow for detection of the time delay or the distortion amount of the common voltage while eliminating the need for a third drive circuit which functions as a common drive circuit in the prior art.

The preferred embodiments of the present invention also provide an LCD which is arranged for allowing for calculation of an amount of distortion of the common voltage resulting from the time delay of the common voltage signal in the common line and common electrode and also facilitates compensation for such distortion of the common voltage applied to the common line.

According to one preferred embodiment of the present invention, a liquid crystal display substrate includes a first substrate having a plurality of pixel electrodes arranged in a matrix; a plurality of row pads and common electrode pads arranged on one side of two adjacent sides of said first substrate; a plurality of column pads and common electrode pads arranged on the other side of the two adjacent sides of said first substrate; a second substrate arranged to be opposite to said first substrate and to interpose a liquid crystal with said first substrate and having a common electrode for performing liquid crystal display by applying a voltage across said pixel electrodes and said common electrode; a single common line formed along only a single one of the two remaining sides of said first substrate so as to allow for measuring a voltage drop in a common voltage signal at a substantially central portion of said matrix; said common line being connected to at least one of said common electrode pad terminals to apply a common potential to said common electrode.

According to another preferred embodiment of the present invention, an LCD includes a lower panel having a plurality of scan lines and a plurality of data lines which are arranged in a matrix by intersecting each other; a pixel electrode disposed at each intersection point between the scan lines and data lines; a single common line which is disposed in the lower panel and extends along only one of four sides of an LCD display area including the pixel electrode so as to allow for measurement of a voltage drop occurring at a substantially central portion of said matrix; at least one connecting member disposed on said single common line; and an upper panel including a common electrode which is connected to the single common line via the at least one connecting member.

According to another preferred embodiment of the present invention, an LCD includes a lower panel having a plurality of scan lines and a plurality of data lines which are arranged in a matrix by intersecting each other; a pixel electrode disposed at each intersection point between the scan lines and data lines; a first common line and a second common line which are disposed in the lower panel surrounding a display area including the pixel electrode, the first common line and the second common line being spaced from each other so as to allow for measurement of a voltage drop occurring in a substantially central portion of the matrix; a plurality of connecting members disposed on the first common line and the second common line; and an upper panel including a common electrode which is connected to the first common line and the second common line through the plurality of connecting members.

Other features and advantages of the present invention will become apparent from the following description of the preferred embodiments of the present invention which are shown in the accompanying drawings.

BRIEF DESCRIPTION OF THE ATTACHED DRAWINGS

FIG. 4b is a cross-sectional view showing the first preferred embodiment of the present invention shown in FIG. 4a.

DETAILED DESCRIPTION OF PREFERRED EMBODIMENTS

Figure 4A:
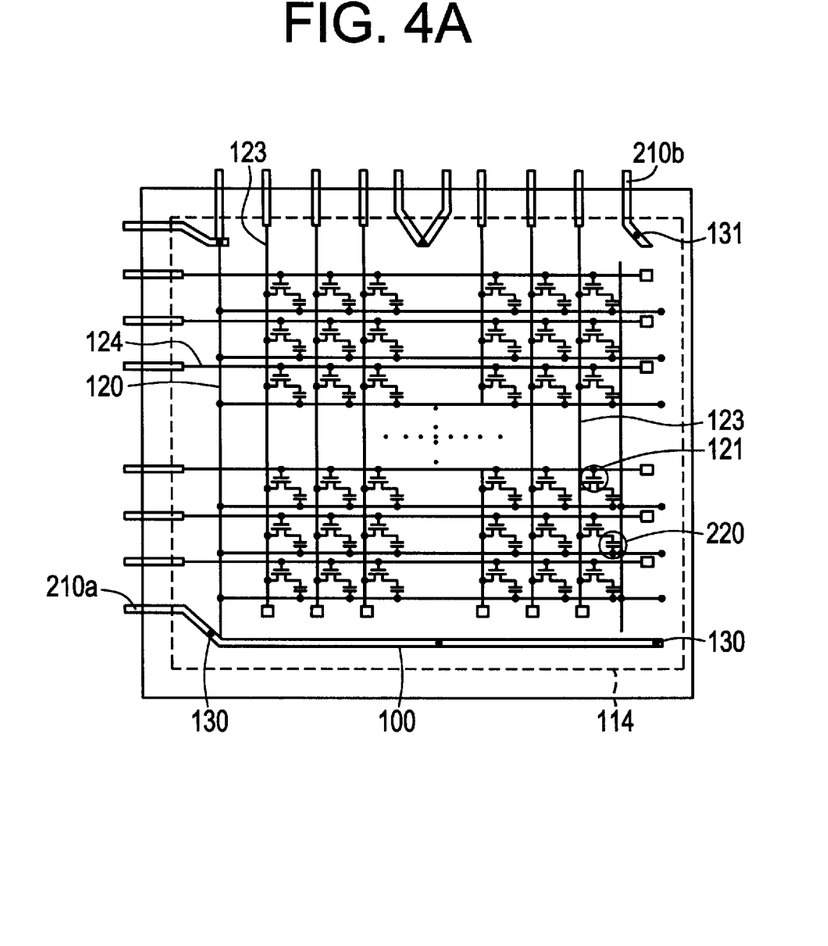
FIG. 4a is a plane view showing a first preferred embodiment of the present invention including an LCD in a storage on common structure having only a single common line.

A preferred embodiment of an LCD according to the present invention, as shown in FIG. 4a, includes a plurality of scan lines 124, a plurality of data lines 123, and a display area having a pixel electrode 220 and a thin film transistor 121 at each intersection area of the scan lines 124 and data lines 123 and a common electrode 114, shown as a dashed-line square. This preferred embodiment further includes a single common line 100 disposed at the outer portion of the display area in parallel with the scan lines 124. As seen in FIG. 4a, the single common line 100 is disposed in the lower side of the display area and is connected to a first common pad 210a located at the lower left corner of the display area.

Figure 4B:
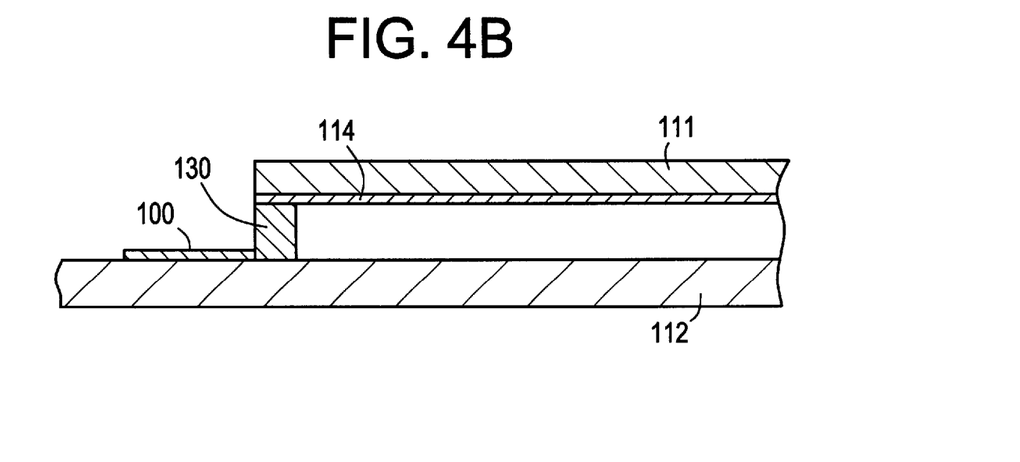

In addition, a first connecting member 130, preferably in the form of a silver dot, is disposed at one position along the single common line 100. A second common pad 210b is located at the upper right corner of the display area but is not connected to the single common line 100. A second connecting member 131, in the form of a silver dot, may be provided at a location of the second common pad 210b. As seen in FIG. 4b, the common line disposed on the lower plate 112 100 connects the common electrode 114 disposed on the upper plate 111 through the silver dots 130 and 131.

The single common line 100 extends from an area near the first connecting member 130 at the lower left corner along a bottom side of the display area to the lower right corner thereof where another first connecting member 130 is located. Any number of connecting members 130 can be disposed along the single common line 100 to reduce distortion of the voltage signal. The single common line 100 does not extend along the right side of the display area as seen in FIG. 4a.

A common electrode 114 is disposed in the upper panel similar to the common electrode 14 in the prior art. The common electrode 114 is connected to the single common line 100 via the first connecting member 130 in the lower left corner of the display area. The common electrode 114 is also connected to the first common pad 210a and the second common pad 210b so as to apply a common voltage. The common electrode 114 may also be preferably connected to the conductive line 120 provided to reduce the delay time of the input common voltage signal.

Before the LCD is assembled into a final product, a common voltage is applied to the single common line 100 through the first common pad 210a. Then, the common voltage is applied to the common electrode 114 and is then finally applied to the second common pad 210b through the second connecting member 131.

As seen in FIG. 4a, with the structure and arrangement of the single common line 100, the single common line 100 does not extend along the right side of the display area and is not extended to the second common pad 210b located at the upper right corner of the display area. As a result of such arrangement, a wave form of the common voltage applied to the second common pad 210b can be calculated because the second common pad 210b is not connected to the first common pad 210a as in the prior art in which the common line extends continuously between the first and second common pads and connects the common pads to each other thereby preventing any detection of input common voltage and output common voltage. Therefore, using the first common pad 210a to detect input common voltage and the second common pad 210b to detect output common voltage with the preferred embodiment of the present invention shown in FIG. 4, the distortion of the common voltage wave form or amount of the drop down voltage of the common voltage occurring in the central portion of the display area can be calculated exactly. Thus, a device for compensating for the detected and calculated precise amount of distortion of the common voltage can be connected to the conductive line 120 and adapted to supply a correction amount of voltage to compensate for the common voltage distortion.

Thus, the single common line 100 shown in FIG. 4a provides significant advantages over the prior art device shown in FIG. 3 in that, in addition to eliminating the need for a third drive circuit which in the prior art functioned as a common drive circuit, the single common line 100 allows for detection of an applied common voltage at the first common pad 210a and an output common voltage at the second common pad 210b and allows a difference between the applied and output common voltages to be calculated which enables elimination of the distortion of the common voltage by applying a compensating voltage to the common electrode 114 via the conductive line 120 connected to the common electrode 114. Because such voltage distortion can be accurately and easily corrected, the LCD incorporating the single common line 100 having the structure and arrangement shown in FIG. 4 significantly reduces flicker and achieves uniformity of the display contrast and brightness.

Figure 4C:
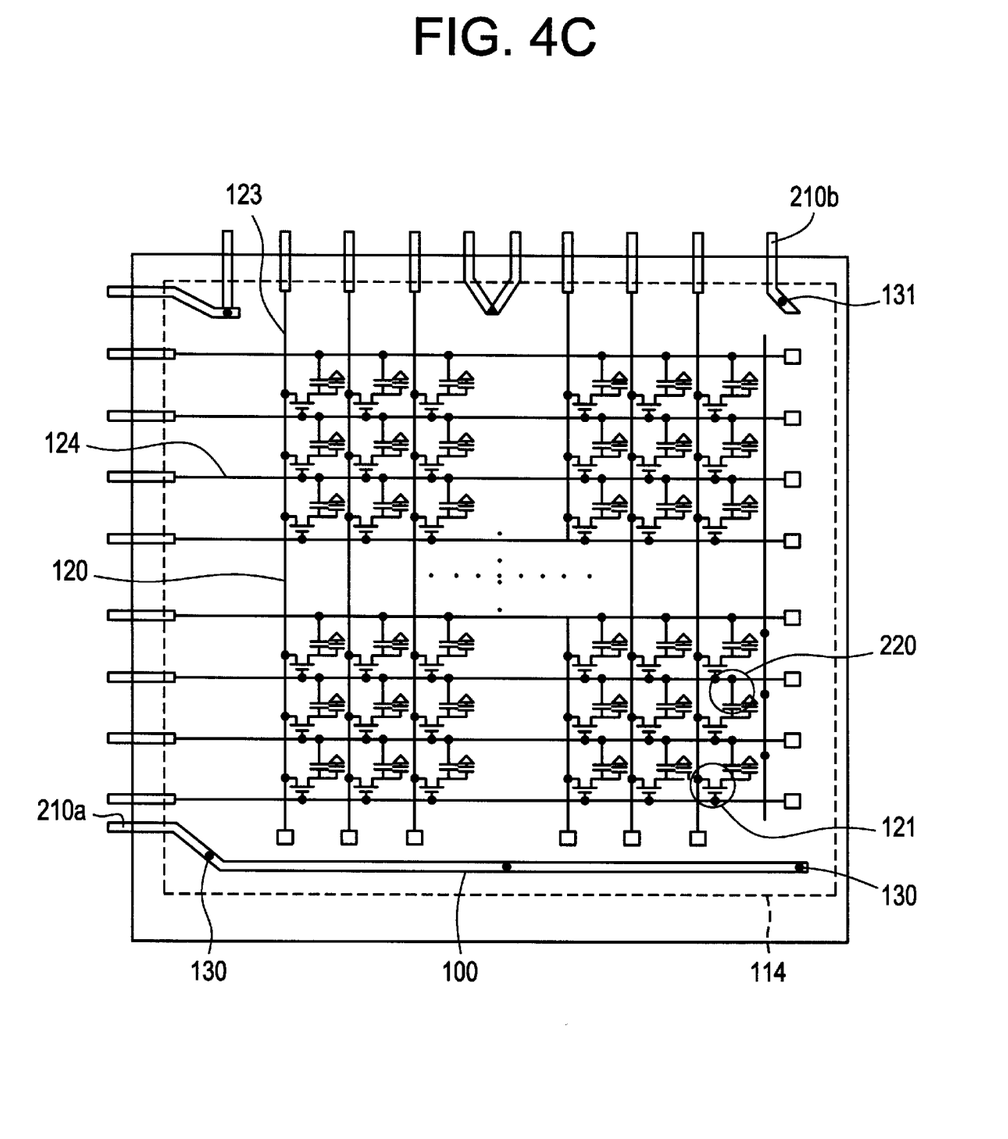
FIG. 4c is a plan view showing a first preferred embodiment of the present invention an LCD in storage on gate structure having only a single common line.

In this preferred embodiment, as seen in FIG. 4a, an LCD in which the storage capacitance has a storage on common structure is disclosed. This preferred embodiment can also be applied to another arrangement of the storage capacitance which is the storage on gate structure. FIG. 4c shows an LCD panel having the single common line 100 in a storage on gate structure.

Additional preferred embodiments of the present invention are shown in FIGS. 5–12, which are described below. It should be noted that each of the preferred embodiments shown in FIGS. 5–12 achieve the same advantages as described above with reference to the preferred embodiment shown in FIG. 4a. Furthermore, these additional preferred embodiments can be adapted to either the storage on common structure or the storage on gate structure of the LCD. In the following description of the additional preferred embodiments, only the storage on common structure will be discussed and illustrated in the corresponding Figures although it should be understood that each of these additional preferred embodiments can also be adapted to the storage on gate structure.

Figure 5:
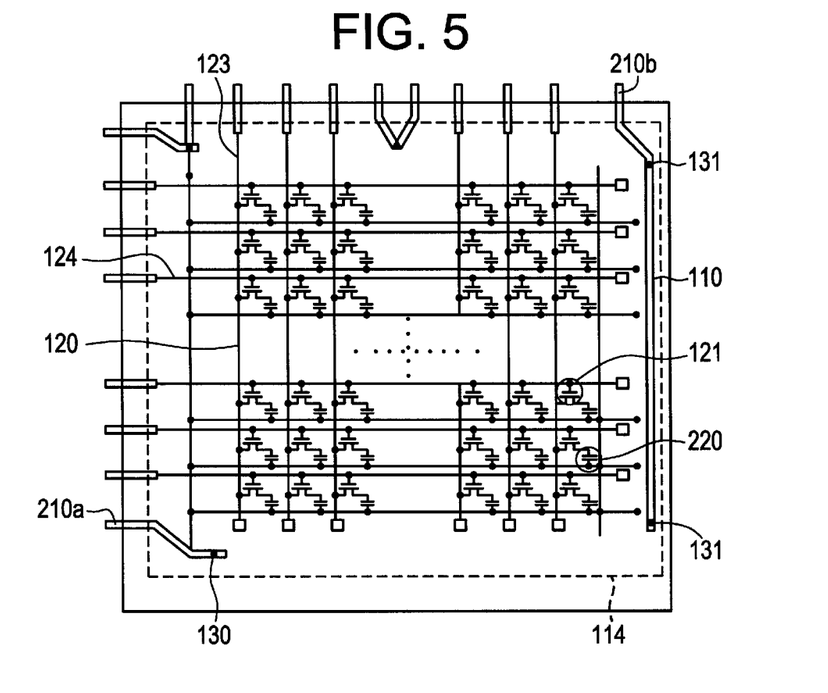
FIG. 5 is a plane view showing a second preferred embodiment of the present invention including an LCD having only a single common line.

A second preferred embodiment is shown in FIG. 5. The second preferred embodiment also includes only a single common line. However, for the purposes of clarity of the description of the present preferred embodiment and those preferred embodiments shown in FIGS. 6–12, the single common line 100 shown in FIG. 4 will be referred to as a first common line 100 and the single common line 110 shown in FIG. 5 will be hereinafter referred to as a second common line 110.

The difference between the first common line 100 of the first preferred embodiment shown in FIG. 4a and the second common line 110 of the second preferred embodiment shown in FIG. 5 is that the second common line 110 is located at the right side of the display area and is connected to the second common pad 210b. The second common pad 210b includes a plurality of connecting members 131 disposed therealong.

As seen in FIG. 5, the second common line 110 extends from the second common pad 210b along the right side of the display area but does not extend to a bottom side of the display area. The first common pad 210a includes a single first connecting member 130 and does not extend along the bottom side of the display area as in the first preferred embodiment shown in FIG. 4a.

As with the second preferred embodiment shown in FIG. 5, the first common pad 210a can be used to detect an input common voltage and the second common pad 210b can be used to detect the output common voltage so that the distortion amount of the common voltage in a central portion of the display area can be calculated and compensated for as described above.

It should be noted that the single common line preferred embodiments shown in FIGS. 4a–4c and 5 are preferred compared to the preferred embodiments shown in FIGS.

6–12 because the preferred embodiments containing only a single common line provide more accurate and reliable calculation of voltage drop.

Figure 6:
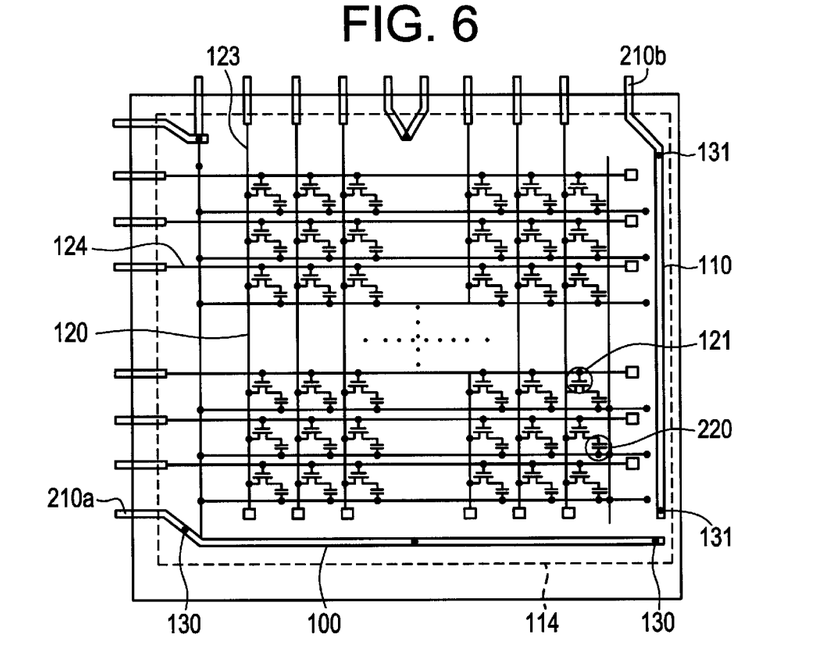
FIG. 6 is a plane view showing a third preferred embodiment of the present invention including an LCD having a first common line and a second common line which are separate from each other.

Another preferred embodiment is shown in FIG. 6. As seen in FIG. 6, the first common line 100 is located at a bottom side of the display area. This preferred embodiment also preferably includes a second common line 110 disposed at the outer portion of the display area in parallel with the data lines 123. The second common line 110 is formed along the right side of the display area shown in FIG. 6.

As seen in FIG. 6, the first common line 100 and the second common line 110 are separate from each other and not continuously formed. The separation between the first common line 100 and the second common line 110 is seen in FIG. 6 in the lower right corner of the display area in the form of a space between the two common lines 100, 110. This space must be provided so that the first common line 100 and the second common line 110 are not continuously formed or connected so as to allow for measurement of a voltage drop occurring in the substantially central portion of the display area. As a result of the structure and arrangement of the first common line 100 and the second common line 110, the applied or input voltage at the first common pad 210a, located at the lower left corner of the display area, can be measured and the resulting or output voltage which is output at the second common pad 210b located at the upper right corner of the display area can be measured. A difference between the two measured voltages provides an accurate measurement of the voltage drop occurring in the substantially central portion of the display area. This voltage drop can be compensated for as described above.

As seen in FIG. 6 and as is true with the preferred embodiments of the present invention shown in FIGS. 4a–12, a common electrode 114 is preferably disposed in the upper panel similar to the common electrode 14 in the prior art. The common electrode 114 is connected to the first common line 100 via the first connecting member 130 in the lower left corner of the display area and to the second connecting member 131 in the upper right corner. This preferred embodiment can still further comprise a conductive line 120 which is connected to the common electrode 114 and performs the function described above with reference to the first preferred embodiment.

Figure 7:
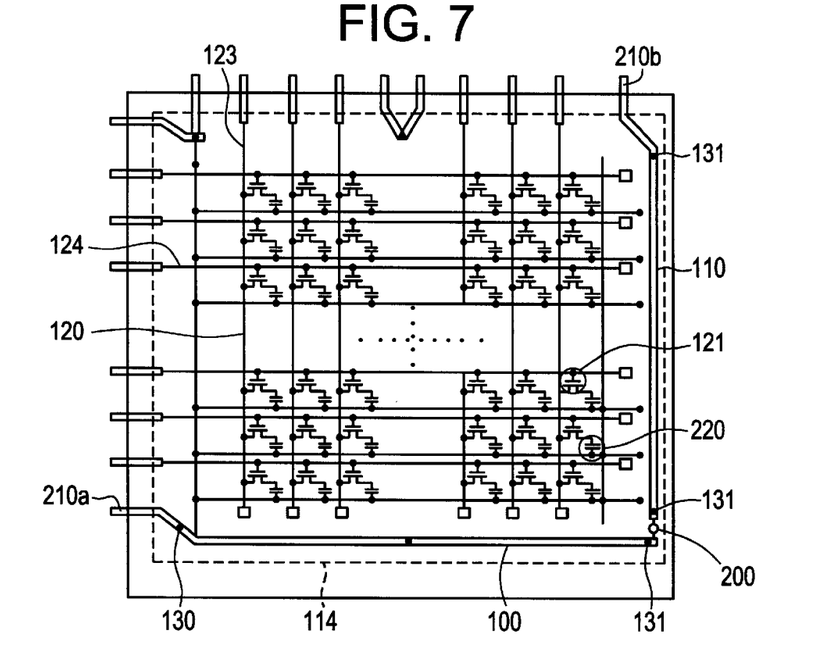
FIG. 7 is a plane view showing a fourth preferred embodiment of the present invention including an LCD having a first common line and a second common line which are separate from each other, and a static electricity protection circuit connecting the first and second common lines.

Another preferred embodiment, which is derived from the preferred embodiment shown in FIG. 6, is shown in FIG. 7. In addition to the structure and arrangement of the first common line 100 and the second common line 110, the second preferred embodiment shown in FIG. 7 further comprises a static electricity protection circuit 200 which connects the first common line 100 with the second common line 110, as shown in FIG. 7. The static electricity protection circuit 200 electrically connects the first common line 100 with the second common line 110 only when a high voltage difference occurs between the lines 100, 110. In a normal state, i.e., when there is a low voltage difference between the first common line 100 and the second common line 110 or when there is not any static electricity therebetween, the first common line 100 and the second common line 110 are electrically isolated.

Figure 8:
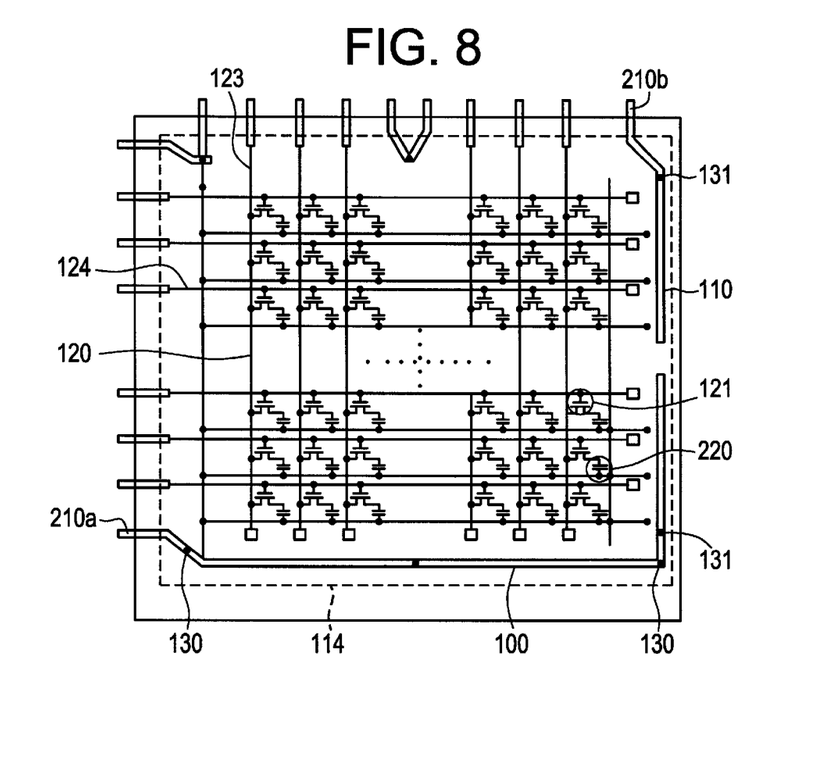
FIG. 8 is a plane view showing a fifth preferred embodiment of the present invention including an LCD having a first common line and a second common line which are separate from each other.

In a further preferred embodiment shown in FIG. 8, the arrangement and structure of the first common line 100 and the second common line 110 is varied as compared to the preferred embodiment shown in FIG. 6. In the preferred embodiment shown in FIG. 8, the area occupied by the second common line 110 is reduced and the area occupied by the first common line 100 is increased such that the first common line 100 extends completely along the bottom side of the display area and along a portion of the right side of the display area. However, the first and second common lines 100, 110 are not connected but instead are still separated by a space to allow for the input common voltage to be measured at the first common pad 210a and the output common voltage to be measured at the second common pad 210b to calculate a precise amount of common voltage distortion occurring in the central portion of the display area.

Figure 9:
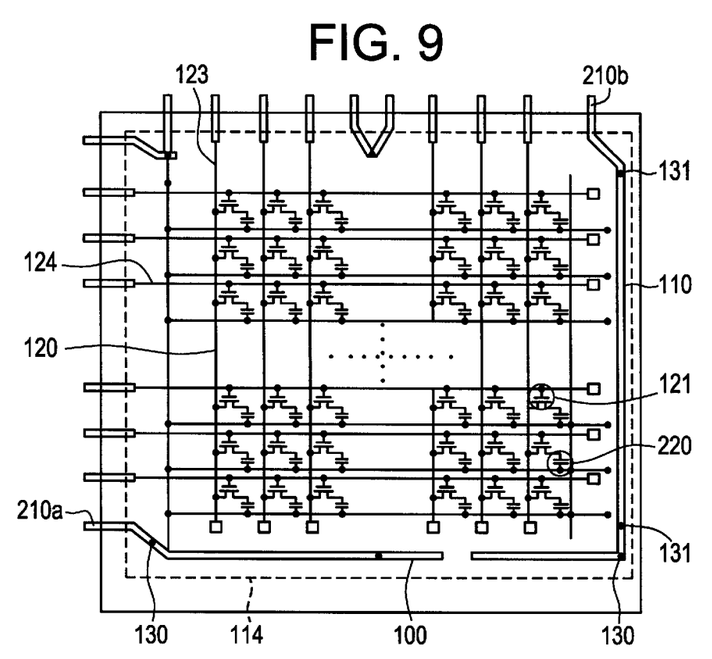
FIG. 9 is a plane view showing a sixth preferred embodiment of the present invention including an LCD having a first and a second common line which are separate from each other.

Alternatively, in the preferred embodiment shown in FIG. 9, the area occupied by the second common line 110 can be expanded and the area occupied by the first common line 100 can be reduced as shown in FIG. 9. Thus, in the preferred embodiment shown in FIG. 9, the first common line 100 extends along only a portion of the bottom side of the display area and the second common line 110 extends along the right side of the display area and down along a portion of the bottom side of the display area. However, the first and second common lines 100, 110 are not connected but instead are still separated by a space to allow for the input common voltage to be measured at the first common pad 210a and the output common voltage to be measured at the second common pad 210b to calculate a precise amount of common voltage distortion occurring in the substantially central portion of the display area.

Thus, it is clear from FIGS. 8 and 9 that the shape of the first common line 100 and the second common line 110 can be formed as desired as long as the first common line 100 is separate from and not continuously formed with or connected to the second common line 110 to allow the voltage drop to be accurately calculated and compensated for as described above.

Figure 10:
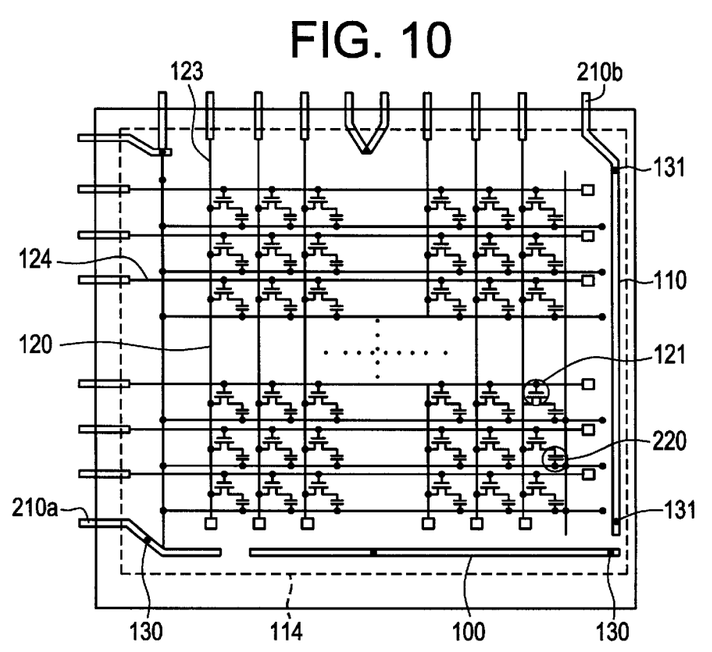
FIG. 10 is a plane view showing a seventh preferred embodiment of the present invention including an LCD having a first common line comprising two separate portions.
Figure 11:
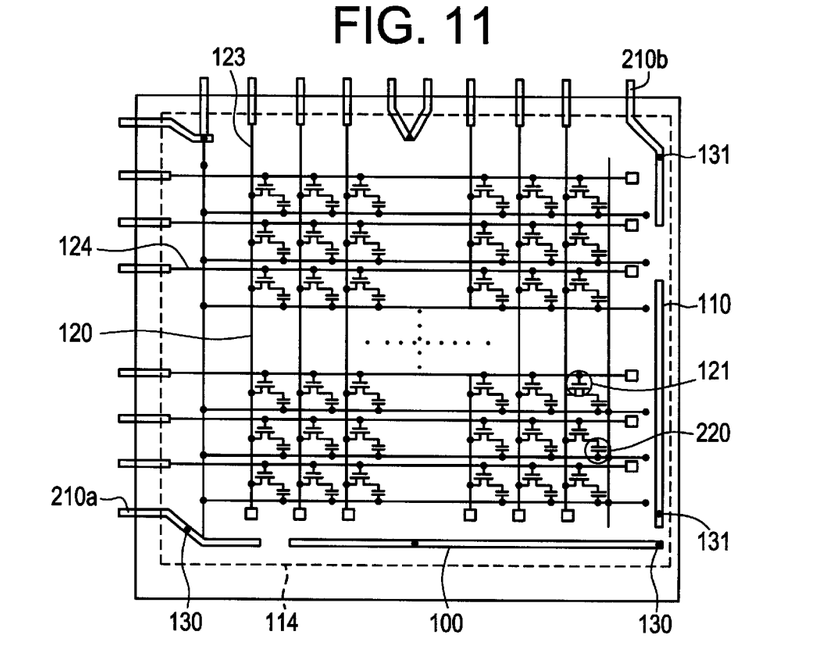
FIG. 11 is a plane view showing a eighth preferred embodiment of the present invention including an LCD having a second common line comprising two separate portions.

In still another preferred embodiment of the present invention, the first common line 100 of the preferred embodiment can comprise at least two separate and independent segments, as shown in FIG. 10. Alternatively, the second common line 110 can comprise at least two separate and independent segments, as shown in FIG. 11. Even though not shown in figures, the first common line 100 and the second common line 110 can comprise at least two separate and independent segments.

Figure 12:
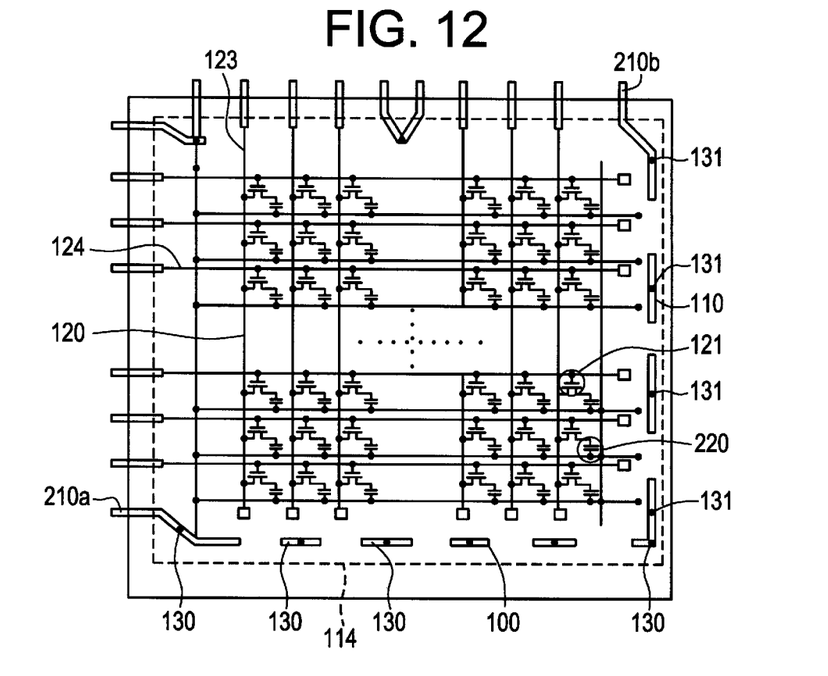
FIG. 12 is a plane view showing a ninth preferred embodiment of the present invention including an LCD having a first common line and a second common line comprising many different segments.

Still alternatively, the first common line 100 and the second common line 110 of another preferred embodiment can comprise a plurality of separate and independent segments, as shown in FIG. 12. Although not shown in FIG. 12, only one of the first common line 100 and the second common line 110 may comprise a plurality of separate and independent segments while the other of the first common line 100 and the second common line 110 may comprise a single independent segment.

As described above, the LCD according to the preferred embodiments of the present invention has a single common line or has independent, spaced first and second common lines, each of which common lines includes a first terminal for applying a common voltage and another terminal, possibly provided on the second common line, including a second terminal for detecting the common voltage. As a result of the structure and arrangement of the single common line or the independently formed and spaced first and second common lines, the input and output common voltages can be accurately detected and the difference therebetween can be precisely calculated to allow for a compensating voltage to be applied to correct for the voltage distortion experienced in the substantially central portion of the display area. Therefore, the preferred embodiments of the present invention eliminate the need for a third drive circuit used in prior art devices and also eliminate the distortion of the common voltage by allowing for calculation and applying of a compensating voltage to the common electrode via the conductive line connected to the common electrode. As a result, the preferred embodiments of the present invention reduce flicker and achieve uniformity of the display quality, such as contrast and brightness.

Although the present invention has been described in relation to preferred embodiments thereof, many variations and modifications and other uses will become apparent to those skilled in the art. It is preferred, therefore, that the present invention be limited not by the specific disclosure herein, but only by the appended claims.

What is claimed is:

1. A liquid crystal display device comprising:
a first substrate having a plurality of pixel electrodes arranged in a matrix;
a plurality of first pads arranged on a first side of two adjacent sides of said first substrate;
a plurality of second pads arranged on a second side of the two adjacent sides of said first substrate, such that only two adjacent sides of said first substrate have pads formed thereon and two remaining sides of said first substrate do not have any pads formed thereon;
a second substrate arranged opposite to said first substrate and containing a liquid crystal between the first substrate and the second substrate, and having a common electrode thereon, to form a liquid crystal display by applying a voltage across said pixel electrodes and said common electrode;
only one common line which is formed along only a single one of the two remaining sides of said first substrate, said only one common line being connected to at least one common electrode pad to apply a common potential to said common electrode.

2. A liquid crystal display device according to claim 1, further comprising at least one connecting member disposed along said single common line.

3. A liquid crystal display device according to claim 2, wherein said at least one connecting member comprises a silver dot.

4. A liquid crystal display device according to claim 2, wherein said at least one connecting member is arranged to connect the single common line with the common electrode.

5. A liquid crystal display device according to claim 1, further comprising a plurality of connecting members disposed along said single common line.

6. A liquid crystal display device according to claim 4, wherein at least one of said plurality of connecting members comprises a silver dot.

7. A liquid crystal display device according to claim 4, wherein at least one of said plurality of connecting members is arranged to connect the single common line with the common electrode.

8. A liquid crystal display device according to claim 1, further comprising a plurality of connecting members disposed on the single common line, each of the connecting members comprising a silver dot.

9. A liquid crystal display device according to claim 1, further comprising a plurality of connecting members, at least two of the plurality of connecting members each being located near a respective one of opposite end portions of the single common line.

10. A liquid crystal display device according to claim 1, wherein the single common line is disposed on a right side of the display area.

11. A liquid crystal display device according to claim 1, wherein the single common line is disposed on a bottom of the display area.

12. A liquid crystal display device according to claim 1, further comprising at least one scanning line connected to at least one of said first pads.

13. A liquid crystal display device according to claim 1, further comprising at least one data line connected to at least one of said second pads.

14. A liquid crystal display device according to claim 1, further comprising at least one storage capacitor line connected to said single common line.

15. A liquid crystal display device according to claim 1, further comprising at least one storage capacitor line arranged such that the common electrode pad applies a common potential to said at least one storage capacitor line.

16. A liquid crystal display device according to claim 1, further comprising a plurality of common electrode pads, wherein a first of said common electrode pads is located at a first corner of said first substrate and a second of said common electrode pads is located at a second corner of said first substrate which is diagonally opposite to said first corner, wherein said single common line is connected to said first of said common electrode pads and is not connected to said second of said common electrode pads.

17. A liquid crystal display device comprising:
a first substrate having a plurality of pixel electrodes arranged in a matrix;
a plurality of scanning lines and data lines arranged in a matrix on said first substrate;
a plurality of first and second pads disposed on two adjacent sides of the first substrate such that only the two adjacent sides of said first substrate have pads disposed thereon and two remaining sides of said first substrate do not have any pads disposed thereon;
a second substrate arranged opposite to said first substrate and containing a liquid crystal between the first substrate and the second substrate, and having a common electrode thereon, to form a liquid crystal display by applying a voltage across said pixel electrodes and said common electrode; and
only one common line which is formed along only a single one of the two remaining sides of the first substrate which do not have pads disposed thereon, said only one common line being connected to a common electrode pad to apply a common potential to said common electrode.

18. A liquid crystal display device according to claim 17, further comprising at least one connecting member disposed along said single common line.

19. A liquid crystal display device according to claim 18, wherein said at least one connecting member comprises a silver dot.

20. A liquid crystal display device according to claim 18, wherein said at least one connecting member is arranged to connect the single common line with the common electrode.

21. A liquid crystal display device according to claim 17, further comprising a plurality of connecting members disposed along said single common line.

22. A liquid crystal display device according to claim 21, wherein at least one of said plurality of connecting members comprises a silver dot.

23. A liquid crystal display device according to claim 21, wherein at least one of said plurality of connecting members is arranged to connect the single common line with the common electrode.

24. A liquid crystal display device according to claim 17, further comprising a plurality of connecting members disposed on the single common line, each of the connecting members comprising a silver dot.

25. A liquid crystal display device according to claim 17, further comprising a plurality of connecting members, at least two of the plurality of connecting members each being located near a respective one of opposite end portions of the single common line.

26. A liquid crystal display device according to claim 17, wherein the single common line is disposed on a right side of the display area.

27. A liquid crystal display device according to claim 17, wherein the single common line is disposed on a bottom of the display area.

28. A liquid crystal display device according to claim 17, further comprising a plurality of first pads disposed on said first substrate, at least one of said scanning lines being connected to at least one of said plurality of first pads.

29. A liquid crystal display device according to claim 17, further comprising a plurality of second pads disposed on said second substrate, at least one of said data lines being connected to at least one of said plurality of second pads.

30. A liquid crystal display device according to claim 17, further comprising at least one storage capacitor line connected to said single common line.

31. A liquid crystal display device according to claim 17, further comprising at least one storage capacitor line arranged such that the common electrode pad applies a common potential to said at least one storage capacitor line.

32. A liquid crystal display device according to claim 17, further comprising a plurality of common electrode pads, wherein a first of said common electrode pads is located at a first corner of said first substrate and a second of said common electrode pads is located at a second corner of said first substrate which is diagonally opposite to said first corner, wherein said single common line is connected to said first of said common electrode pads and is not connected to said second of said common electrode pads.

* * * * *